United States Patent
Zhang et al.

(10) Patent No.: US 11,965,257 B2
(45) Date of Patent: Apr. 23, 2024

(54) METHOD FOR PREPARING COF-PROTECTED ELECTROLYTIC HYDROGEN PRODUCTION ELECTRODE

(71) Applicant: Huaneng Clean Energy Research Institute, Beijing (CN)

(72) Inventors: Chang Zhang, Beijing (CN); Jinyi Wang, Beijing (CN); Zhibo Ren, Beijing (CN); Pengjie Wang, Beijing (CN); Xianming Xu, Beijing (CN); Huan Zhang, Beijing (CN)

(73) Assignee: Huaneng Clean Energy Research Institute, Beijing (CN)

( * ) Notice: Subject to any disclaimer, the term of this patent is extended or adjusted under 35 U.S.C. 154(b) by 0 days.

(21) Appl. No.: 18/256,075

(22) PCT Filed: Dec. 23, 2021

(86) PCT No.: PCT/CN2021/140999
§ 371 (c)(1),
(2) Date: Jun. 6, 2023

(87) PCT Pub. No.: WO2023/010773
PCT Pub. Date: Feb. 9, 2023

(65) Prior Publication Data
US 2024/0035178 A1    Feb. 1, 2024

(30) Foreign Application Priority Data
Jul. 31, 2021  (CN) .......................... 202110877174.6

(51) Int. Cl.
C25B 11/052   (2021.01)
C25B 1/02     (2006.01)
(Continued)

(52) U.S. Cl.
CPC .............. *C25B 11/052* (2021.01); *C25B 1/02* (2013.01); *C25B 11/055* (2021.01); *C25B 11/085* (2021.01)

(58) Field of Classification Search
None
See application file for complete search history.

(56) References Cited

U.S. PATENT DOCUMENTS

| 2017/0130349 A1 | 5/2017 | Ramanathan et al. |
| 2021/0115583 A1 | 4/2021 | Takanabe et al. |

FOREIGN PATENT DOCUMENTS

| CN | 108479813 A | 9/2018 |
| CN | 108671962 A | 10/2018 |

(Continued)

OTHER PUBLICATIONS

Yang et al. (Chem.Mater.2020, 32, 5634-5640) (Year: 2020).*

(Continued)

*Primary Examiner* — Wojciech Haske

(57) ABSTRACT

A method for preparing a COF-protected electrode and an electrode are provided. The method includes mixing an organic framework, a small molecular organic acid and a solvent, adding a polar aqueous solution containing a substrate thereto, mixing the above uniformly and heating the system at a low temperature under an inert atmosphere, filtering the solution to obtain precipitates, washing and drying the precipitates to obtain a COF film grown on a surface of the substrate; coating a protective layer on the COF film to obtain a substrate/COF/protective layer film; etching off the substrate to obtain a COF/protective layer film; and transferring the COF/protective layer film to a surface of the electrode, and removing the protective layer.

8 Claims, 1 Drawing Sheet

(51) Int. Cl.
   *C25B 11/055* (2021.01)
   *C25B 11/085* (2021.01)

(56) References Cited

FOREIGN PATENT DOCUMENTS

| CN | 108997590 A | 12/2018 |
|---|---|---|
| CN | 111087615 A | 5/2020 |
| CN | 111333852 A | 6/2020 |
| CN | 111540620 A | 8/2020 |
| CN | 112403519 A | 2/2021 |
| CN | 112679781 A | 4/2021 |
| CN | 113668006 A | 11/2021 |

OTHER PUBLICATIONS

Machine translation of Luo et al. CN 108997590 A (Year: 2018).*
Machine translation of Tang et al. CN 111087615 A (Year: 2020).*
ISR for PCT application PCT/CN2021/140999.
English translation of ISR for PCT application PCT/CN2021/140999.
OA for CN application 202110877174.6.
English translation of OA for CN application 202110877174.6.
Covalent organic framework-supported platinum nanoparticles as efficient electrocatalysts for water reduction.
Application of covalent organic frame work materials ( COFs) in heterogeneous catalysis.
Notice of Allowance for CN application 202110877174.6.
English translation of Notice of Allowance for CN application 202110877174.6.
OA for CN application 202110877180.1.
English translation of OA for CN application 202110877180.1.
Construction of a novel 2D-2D heterojunction by coupling a covalent organic framework and In2S3 for photocatalytic removal of organic pollutants with high efficiency.
Electrochemically Facile Hydrogen Evolution Using Ruthenium Encapsulated Two Dimensional Covalent Organic Framework (2D COF).
Notice of Allowance for CN application 202110877180.1.
English translation of Notice of Allowance for CN application 202110877180.1.

* cited by examiner

METHOD FOR PREPARING COF-PROTECTED ELECTROLYTIC HYDROGEN PRODUCTION ELECTRODE

CROSS-REFERENCE TO RELATED APPLICATION

This application is a national phase entry under 35 USC § 371 of International Application PCT/CN2011/140999, filed Dec. 23, 2011, which claims priority to and benefits of Chinese Patent Application No. 202110877174.6, filed with the China National Intellectual Property Administration on Jul. 31, 2022, the entire content of which is incorporated herein by reference.

FIELD

The present disclosure relates to a field of a hydrogen production electrode, and more particularly to a method for preparing a covalent organic framework (COF) protected electrode and an electrode prepared.

BACKGROUND

Non-precious metal catalysts for a hydrogen electrocatalytic reaction (HER) have poor stability under acidic conditions, which limits the application scopes. Therefore, stability of a catalytic metal on the electrode in electrolytic hydrogen production is poor. Using carbon layer coating for protection is a common strategy for catalytic metal particles at present. However, the formation of the carbon layer is generally accompanied by high-temperature calcination, which has an adverse effect on the electrode activity. For increasing proton conduction, improving stability, and improving interfacial charge synergy, the structure of the protective layer needs to be regulated carefully, but the strategy of the regulation process is not generally applicable. For shaped electrodes, it is hard to obtain a protective layer that is capable of being peeled off and assembled freely.

SUMMARY

The present disclosure aims to solve at least one of the technical problems in the related art at least to some extent.

In view of this, in a first aspect of the present disclosure, a method for preparing a covalent organic framework (COF) protected electrode is provided. The method includes:
  mixing an organic framework and a small molecule organic acid at a molar ratio of 0.5:1 to 1:1 with a solvent, adding a polar aqueous solution containing a pretreated substrate thereto, mixing the solvent and the polar aqueous solution uniformly and heating the solution at a temperature of 100° C. to 150° C. under an inert atmosphere for 72 hours, filtering the solution to obtain precipitates, washing and drying the precipitates to obtain a structure COF film with a thickness of 10 nm to 100 nm grown on a surface of the substrate; in which a ratio of a mass of the organic framework and the small molecule organic acid to a volume of the solvent is 10 g:1 L to 30 g:1 L; a volume ratio of the polar aqueous solution to the solvent is 1:4 to 1:6; a content of the pretreated substrate in the polar aqueous solution is 20 g/L to 60 g/L;
  coating a protective layer on the COF film to obtain a substrate/COF/protective layer film; in which a thickness of the protective layer is 10 nm to 100 nm;
  etching off the substrate to obtain a COF/protective layer film;
  washing the COF/protective layer film with deionized water several times to obtain a mixed solution containing the COF/protective layer film, in which the COF/protective layer film floats on a surface of the mixed solution;
  transferring the COF/protective layer film to a surface of the electrode and removing the protective layer.

Additional aspects and advantages of embodiments of the present disclosure will be given and become apparent in part in the following descriptions, or be learned from the practice of the embodiments.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Embodiments of the present disclosure are described in detail below. The embodiments described herein are explanatory, and used to generally explain the present disclosure and shall not be construed to limit the scope of the present disclosure.

Solutions of the present disclosure are explained below in conjunction with embodiments. Those skilled in the art will understand that the following embodiments are only for illustrating the present disclosure and should not be construed to limit the scope of the present disclosure. If no specific technique or condition is indicated in the embodiments, it shall be carried out according to the technique or condition described in a literature in a related field or according to the product specification. Reagents or instruments used that are not indicated by manufacturer are commercially available conventional products.

In order to protect the electrodes, the present disclosure coats a covalent organic framework (COF) film on one side of the electrode, through which the COF film will effectively realize the protective effect on the electrode, and a specific preparation process of the electrode protected by the COF film is described in detail through the following examples and accompanying drawings.

An object of the present disclosure is to provide a method for preparing a COF protected electrode, and the electrode may be an electrolytic hydrogen production electrode. A layer of COF film is coated onto a surface of the electrode in the method. COF has good proton transport ability, so that protons may be effectively transferred from the electrolyte to the surface of the internal catalytic metal while coating and protecting the internal metal without affecting the catalytic performance, and the coating layer formed on the surface of the metal plate may help avoid the passivation of the internal active layer during use and improve the HER catalytic effect.

Figure 1:
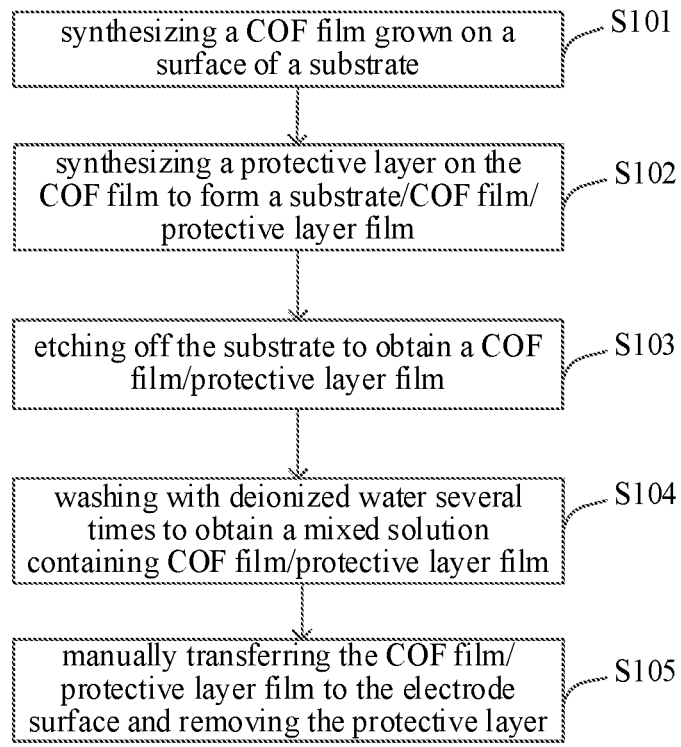
FIG. 1 is a flowchart showing a method for preparing a COF protected electrode according to an embodiment of the present disclosure.

In order to achieve the above-mentioned purpose, the present disclosure provides a method for preparing a COF protected electrode. As shown in FIG. 1, the method includes the following steps.

In S101, after mixing an organic framework, a small molecule organic acid and a solvent, a polar aqueous solution containing a substrate is added thereto, and all the components are mixed evenly. The solution is heated at a low temperature under an inert atmosphere, and then filtered. the precipitates are washed and dried to obtain a COF film grown on a surface of the substrate.

In S102, a protective layer is coated on the COF film to obtain a substrate/COF/protective layer film.

In S103, the substrate is etched off to obtain a COF/protective layer film.

In S104, the COF/protective layer film is washed with deionized water for several times to obtain a mixed solution containing the COF/protective layer film. The COF/protective layer film floats on a surface of the mixed solution.

In S105, the COF/protective layer film is transferred onto a surface of the electrode and the protective layer is moved.

In the present disclosure, a protective layer is used to protect the COF film during the substrate etching process and prevent the COF film from degradation by the substrate etchant.

Furthermore, the obtained COF film/electrode system is heated in vacuum at 80° C. to 120° C. for 1 to 3 hours to remove the residual liquid between the COF film and the electrode, thus the COF film may fully contact with the surface of the electrode.

The COF film supported on the substrate is prepared by in-situ reaction on the substrate, and then the substrate is etched away to form a free COF film. In this way, the COF film is directly attached to the surface of the metal plate of the electrode, thus can protect the electrode from corrosion in acidic environments, and help avoid the passivation of the internal active layer during use, so as to maintain stable catalytic performance in a long-term work. The carbon framework of the COF film can introduce various coordination atoms (such as S, P, N, B and so on) to enhance charge transfer effect, which promotes the electrocatalytic performance of HER. Since the hierarchical pore structure of COF is conducive to gas diffusion, it may help avoid the additional resistance caused by the accumulation of gas on the electrode surface, thus improving the electrocatalytic reaction effect. The hierarchical pore structure of COF accelerates the proton transport, meanwhile has little effect on the catalytic performance of the core metal plate. Since COF has good proton transport ability, it can effectively transfer protons from the electrolyte while coat and protect the internal metal without affecting the catalytic performance of the metal.

In one embodiment, the organic framework and the small molecule organic acid are added at a molar ratio of 0.5:1 to 1:1.

In one embodiment, the organic framework is monocyclic or polycyclic aromatics, and heterocyclic or multi-group modified derivatives thereof. That is, the organic framework is one of monocyclic aromatics, polycyclic aromatics, heterocyclic modified derivatives of monocyclic aromatics, heterocyclic modified derivatives of polycyclic aromatics, multi-group modified derivative of monocyclic aromatics, and multi-group modified derivative of polycyclic aromatics. Specifically, the organic framework may be organic compounds such as benzenes, anthracenes, phenols, pyridines, pyrimidines, and triazines.

In one embodiment, the small molecule organic acid is one of sulfonic acid organic compounds, phosphoric acid organic compounds, amino organic compounds, silicic acid organic compounds, or boric acid organic compounds.

Specifically, the COF film has an ordered porous structure that is constructed by connecting carbon and oxygen with covalent bonds. By changing precursor units (types of the organic framework and the small molecule organic acid) in the COF film preparation process, the COF film may be doped with nitrogen, sulfur, phosphorus, boron or other elements. By doping heteroatoms, electron density distribution may be regulated locally to enhance the charge transfer effect, thereby promoting the electrocatalytic performance of HER.

In one embodiment, a ratio of a mass of the organic framework and the small molecule organic acid to a volume of the solvent is 10 g:1 L to 30 g:1 L.

In an embodiment, the solvent is prepared by mixing a strong polar solvent and a weak polar solvent at a volume ratio of 1:0 to 1:5.

In one embodiment, the solvent is a common organic solvent, such as nitriles, alcohols, acids, esters, amines, alkyl halides, benzene and their derivatives.

By adjusting the types and the contents of the organic framework and the small molecule organic acid, and a ratio of the organic framework to the small molecule organic acid, a structure of the COF film may be adjusted. By adjusting the ratio of a mass of the organic framework and the small molecule organic acid to a volume of the solvent, the thickness of the COF film may be adjusted, so as to adjust of the charge transfer effect of the COF film. The COF film has high protective effect on the electrode, and the composition and thickness of the film framework are highly adjustable, which may be designed according to chemical properties and physical morphology of the core metal plate to achieve interface regulation and improve HER charge transport.

In one embodiment, a volume ratio of the polar aqueous solution to the solvent is 1:4 to 1:6.

In one embodiment, a content of the substrate in the polar aqueous solution is 20 g/L to 60 g/L.

In one embodiment, the polar aqueous solution is an organic compound aqueous solution of small molecule alcohol or acid with not more than 4 carbon atoms, and the organic compound and water are added at a volume ratio of 1:1 to 2:1 in the aqueous solution of the organic compound.

In one embodiment, the substrate is one of inert organic materials, inorganic oxides, or metals, such as polymethyl methacrylate, polydimethylsiloxane, silicon dioxide, silicon wafers, copper wafers and the like. The cost-effective substrate provides a space for COF growth and film formation, and has a certain affinity with the precursor of COF, and is easy to remove.

Figure 2:
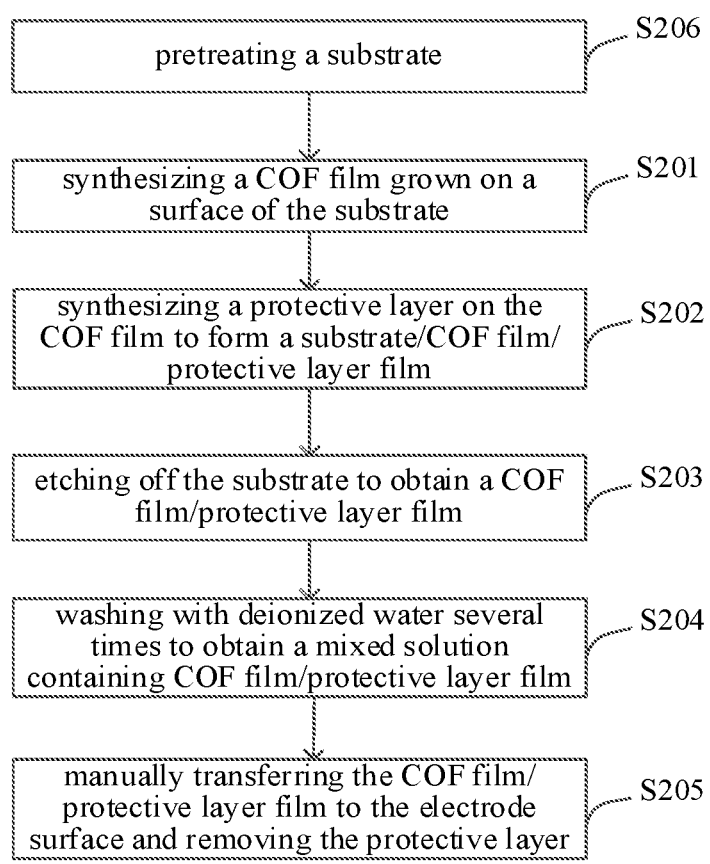
FIG. 2 is a flowchart showing a method for preparing a COF protected electrode according to another embodiment of the present disclosure.

As shown in FIG. 2, the method of the present disclosure further includes: S206, pretreating the substrate. Steps S201 to S205 in FIG. 2 are basically the same as steps S101 to S105 in FIG. 1, which is not repeated here.

The above-mentioned includes cleaning the substrate with water and an organic solvent in sequence; pickling the substrate under a heating condition, in which the heating temperature may be 80° C. to 120° C.; cleaning the substrate with water for 2 to 3 times after pickling, and soaking the substrate with an acetone solution in 3-aminopropyl trimethoxysilane under an inert atmosphere; and washing the soaked substrate with water and drying the substrate. The drying process may be vacuum drying.

In one embodiment, mixing the components uniformly and heating the solution at a low temperature under an inert atmosphere is performed at a temperature of 100° C. to 150° C. for a heating time of 72 hours.

In one embodiment, during filtrating, washing and drying, precipitates formed are collected by filtration, and the residual monomers are removed with an organic solvent. The organic solvent is a combination of 1 to 2 kinds of weak polar solvents and 1 to 2 kind of strong polar solvents, such as nitriles, alcohols, acids, esters, amines, haloalkanes, benzenes and their derivatives.

In one embodiment, the feedstock of the protective layer is the solution of polymethyl methacrylate, polysulfone, polyether, polytetrafluoroethylene, or Nafion membrane. The protective layer has good stability in an etching environment and may protect the COF from degradation of by an etchant. The thickness of the protective layer is 10 nm to 100 nm, and the thickness of the COF film is 10 nm to 100 nm. The setting of the thickness masks the protective layer not only perform strict protection for the electrode, but also be material-effective and convenient for the subsequent removal.

In one embodiment, the process of etching off the substrate includes soaking the substrate/COF/protective layer film in an etching solution for 12 to 24 hours, and then washing the substrate/COF/protective layer film with water and ethanol solution for 2 to 3 times respectively. The etching solution is a strong acid solution, which can be 2% HF aqueous solution or aqua regia solution.

In an embodiment, the process of removing the protective layer includes soaking and washing a protective layer/COF film/electrode composite with an organic solvent for 2 to 3 times, and washing it with ethanol and deionized water for 2 to 3 times respectively. The organic solvent is a common organic solvent, such as nitriles, alcohols, acids, esters, amines, haloalkanes, benzenes and their derivatives.

Another aspect of the present disclosure provides an electrode prepared by the above-mentioned method for preparing the COF protected electrode.

It should be understood that the technical features and technical effects described in the method embodiments of the present disclosure are also applicable to the electrodes of the present disclosure, and will not be repeated here.

The present disclosure will be further described below through specific examples.

Example 1

A substrate is pretreated. A silicon wafer is used as substrate, and is washed with water, ethanol, and ethyl acetate in sequence. The substrate is washed with 98% concentrated sulfuric acid under heating conditions of 80° C. to 120° C. After fully washed for 2 to 3 times, the substrate is soaked in the acetone solution of 3-aminopropyl trimethoxysilane under an inert atmosphere (such as argon, nitrogen) for 2 to 3 days, and finally the soaked substrate is fully washed with water and dried in vacuum.

A COF film is synthesized on the surface of the substrate. An organic framework 2,4,6-triformylphloroglucinol and a small molecule organic acid 2,5-diaminobenzenesulfonic acid are added into a heat-resistant container at a molar ratio of 0.5:1. At the same time, a solvent (n-butanol and o-dichlorobenzene mixed at a volume ratio of 1:1) is added into the heat-resistant container, inn which 15 g of 2,4,6-triformylphloroglucinol and 2,5-diaminobenzenesulfonic acid is added into every 1 liter of solution. The substrate pretreated in step S1 is added in the ethanol aqueous solution (volume ratio of ethanol and water is 1:1), and the content of the substrate pretreated in polar aqueous solution is 30 g/L. The ethanol aqueous solution containing the substrate is added in the heat-resistant container, the volume ratio of the ethanol aqueous solution to the solvent is 1:4. The reaction mixture is sonicated to obtain a uniform suspension. The obtained suspension is heated to a low temperature for a period of time under an inert atmosphere, that is, the reactor is heated to 100° C. for 72 hours, and then the precipitate formed is collected by filtration, and the residual monomers are removed with organic solvents, such as dioxane, ethanol and acetone. The precipitate is dried in vacuum at 100° C. for more than 12 hours to obtain a COF film grown on the substrate, and the thickness of the COF film is 10 nm to 100 nm.

A protective layer is synthesized on the COF film to form a substrate/COF film/protective layer film. A layer of protective layer material is coated on the surface of the COF film by spin coating. The feedstock of the protective layer may be the solution of polymethyl methacrylate, polysulfone, polyether, polytetrafluoroethylene, or Nafion membrane, and the thickness of the protective layer is 10 nm to 100 nm.

The substrate is etched away to obtain a COF film/protective layer film. The substrate/COF film/protective layer film is soaked in an etching solution of 2% HF aqueous solution for 12 to 24 h, and then washed with water and ethanol solution for 2 to 3 times respectively.

The COF film/protective layer film is washed with deionized water for several times to obtain a mixed solution containing a COF film/protective layer film, and the COF film/protective layer film floats on the surface of the mixed solution.

The COF film/protective layer film is manually transferred to the surface of the electrode, and then the protective layer is removed. The COF/protective layer film obtained is manually transferred to the surface of a metal plate of the electrode, and then soaked in acetone for 12 to 24 h and washed with water and ethanol solution for 2 to 3 times. In this way, the protective layer is removed to obtained a free COF film. At this time, the layer of COF film is directly compounded on the surface of the metal plate of the electrode, and the obtained COF film/electrode system is dried at 80 to 120° C. for 1 to 3 hours in vacuum, thereby removing residual liquid between the COF film and the electrode to make the COF film fully contact with the surface of the electrode.

Example 2

The specific preparation process is the same as in Example 1, and the organic framework and the small molecule organic acid in Example 1 are replaced by 1,4,5,8-tetrahydroxyanthraquinone and tetramethylorthosilicate, respectively.

Performance test experiments are performed on the COF protected electrode for hydrogen electrolytic production prepared in Example 1 and Example 2. The specific tests are as follows, and the specific test results are shown in Table 1 and Table 2.

Electrochemical experiment. In a standard three-electrode system connected to an electrochemical workstation, the hydrogen evolution overpotential of the electrolytic hydrogen production electrode was tested, with a platinum electrode as the auxiliary electrode and a mercury-mercury oxide electrode as the reference electrode. All the tests are carried out at 25° C. and the electrolyte is 0.5M $H_2SO_4$ solution. The voltage sweep speed is 10 mV/s, and the current density is set to 10 mA/cm2 or 100 mA/cm2. Furthermore, the performance attenuation of the electrode is estimated by the change rate of the hydrogen evolution overpotential after working at a constant current density for a period of time. The decay rate is calculated by the equation: $(\eta t-\eta 0)/\eta 0 t$. The initial hydrogen evolution overpotential $\eta 0$ is measured at t=0. The hydrogen evolution overpotential at the time t, $\eta t$, is measured after the system has worked for the time t. In the performance decay rate experiment, the current density is set as 100 mA/cm2, and the working time is set as t=12 h.

Table 1 shows performance test results of different types of electrolytic hydrogen production electrodes composed of COF protected electrodes prepared in Example 1.

| type of electrode | $\eta_{10}$, mV | $\eta_{100}$, mV | performance decay rate, %/1000 h |
|---|---|---|---|
| Ni/COF | 443 | 1621 | 0.5 |
| Ni | 436 | 1597 | 6.7 |
| Fe/COF | 791 | 2363 | 1.2 |
| Fe | 782 | 2354 | 15.3 |
| NiFe/COF | 384 | 1221 | 0.4 |
| NiFe | 383 | 1216 | 7.8 |

Table 2 shows performance test results of different types of electrolytic hydrogen production electrodes composed of COF protected electrodes prepared in Example 2.

| type of electrode | $\eta_{10}$, mV | $\eta_{100}$, mV | performance decay rate, %/1000 h |
|---|---|---|---|
| Ni/COF | 252 | 809 | 0.4 |
| Ni | 236 | 797 | 6.7 |
| Fe/COF | 299 | 982 | 1.5 |
| Fe | 282 | 954 | 15.3 |
| NiFe/COF | 194 | 837 | 0.3 |
| NiFe | 183 | 816 | 7.8 |

As shown in Table 1 and Table 2, the voltage decay rates of the COF protected electrodes for electrolytic hydrogen production are not higher than 1.5%/1000 h.

It should be noted that in the description of the present disclosure, terms such as "first" and "second" are used for description purposes only, and should not be understood as indicating or implying relative importance. In addition, in the description of the present application, unless otherwise specified, "a plurality of" means two or more than two, unless specified otherwise.

Any process or method described in a flowchart or described herein in other ways may be understood to include one or more modules, segments or portions of codes of executable instructions for achieving specific logical functions or steps in the process, and the scope of the embodiments of the present disclosure includes other implementations, in which functions may be performed out of an order shown or discussed, including in substantially simultaneous fashion or in reverse order depending on the functions involved, which shall be understood by those skilled in the art to which the embodiments of the present disclosure belong.

In the description of the specification, descriptions referring to the terms "an embodiment", "some embodiments", "an example", "a specific example", or "some examples" mean that specific features, structures, materials or characteristics described in connection with embodiments or examples are included in at least one embodiment or example of the present disclosure. In this specification, schematic representations of the above terms do not necessarily refer to the same embodiment or example. Furthermore, the specific features, structures, materials or characteristics described may be combined in any suitable manner in any one or more embodiments or examples.

Although the embodiments of the present application have been shown and described above, it is understood that the above embodiments are illustrative and should not be construed as limitations on the present disclosure, and those skilled in the art may make the above-mentioned embodiments are subject to changes, modifications, substitutions and variations.

What is claimed is:

1. A method for preparing a covalent organic framework (COF) protected electrode for electrolytic preparation of hydrogen, comprising:
    mixing an organic framework and a small molecule organic acid at a molar ratio of 0.5:1 to 1:1 with a solvent, adding a polar aqueous solution containing a pretreated substrate thereto, mixing the solvent and the polar aqueous solution uniformly and heating the solution at a temperature of 100° C. to 150° C. under an inert atmosphere for 72 hours, filtering the solution to obtain precipitates, washing and drying the precipitates to obtain a structure COF film with a thickness of 10 nm to 100 nm grown on a surface of the substrate;
    wherein a ratio of a mass of the organic framework and the small molecule organic acid to a volume of the solvent is 10 g:1 L to 30 g:1 L;
    a volume ratio of the polar aqueous solution to the solvent is 1:4 to 1:6; a content of the pretreated substrate in the polar aqueous solution is 20 g/L to 60 g/L;
    coating a protective layer on the COF film to obtain a substrate/COF/protective layer film; wherein a thickness of the protective layer is 10 nm to 100 nm;
    etching off the substrate to obtain a COF/protective layer film;
    washing the COF/protective layer film with deionized water for several times to obtain a mixed solution containing the COF/protective layer film, wherein the COF/protective layer film floats on a surface of the mixed solution;
    transferring the COF/protective layer film to a surface of the electrode and removing the protective layer.

2. The method according to claim 1, wherein the organic framework is selected from monocyclic or polycyclic aromatics, and heterocyclic or multi-group modified derivatives thereof;
    the small molecule organic acid is one of sulfonic acid organic compounds, phosphoric acid organic compounds, amino organic compounds, silicic acid organic compounds, or boric acid organic compounds.

3. The method according to claim 1, wherein the solvent is prepared by mixing a strong polar solvent and a weak polar solvent at a volume ratio of 1:0 to 1:5.

4. The method according to claim 1, wherein the polar aqueous solution is an aqueous solution of small molecule alcohol or acid organic compound with not more than 4 carbon atoms, and the organic compound and water are added at a volume ratio of 1:1 to 2:1;
    the substrate is one of inert organic materials, inorganic oxides, or metals.

5. The method according to claim 1 wherein pretreating of the pretreated substrate comprises:
    cleaning the substrate with water and an organic solvent in sequence;
    pickling the substrate under a heating condition;

cleaning the substrate with water after pickling, and soaking the substrate with an acetone solution of 3-aminopropyl trimethoxysilane under an inert atmosphere; and washing the substrate soaked with water and drying the substrate.

6. The method according to claim 1, wherein during filtrating, washing and drying, the precipitates formed are collected by filtration and residual monomers are removed with an organic solvent.

7. The method according to claim 1, wherein a feedstock of the protective layer is a solution of polymethyl methacrylate, polysulfone, polyether, polytetrafluoroethylene, or Nafion membrane.

8. The method according to claim 1, wherein etching off the substrate comprises:

soaking the substrate/COF/protective layer film in an etching solution for 12 to 24 hours, and then washing the substrate/COF/protective layer film with water and an ethanol solution for 2 to 3 times respectively.

* * * * *